Figure 1:
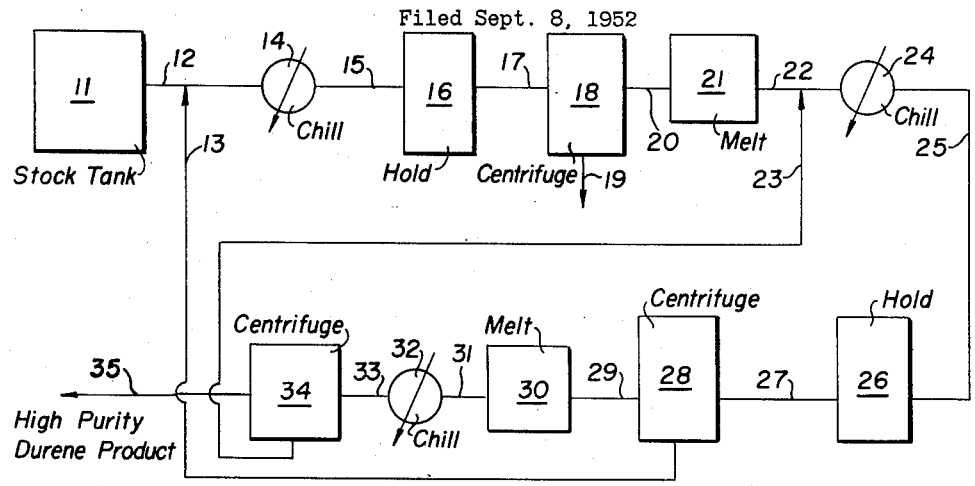

Jan. 1, 1957  R. B. BENNETT ET AL  2,776,328
DURENE RECOVERY PROCESS
Filed Sept. 8, 1952

INVENTORS.
Rufus B. Bennett,
Reuben F. Pfennig,
Raymond A. Speed,
BY
ATTORNEY

2,776,328

DURENE RECOVERY PROCESS

Rufus B. Bennett, Reuben F. Pfennig, and Raymond A. Speed, Baytown, Tex., assignors, by mesne assignments, to Esso Research and Engineering Company, Elizabeth, N. J., a corporation of Delaware Application September 8, 1952, Serial No. 308,305

4 Claims. (Cl. 260—674)

The present application relates to a process for recovering high purity durene from a hydrocarbon mixture containing durene.

More particularly the present invention is directed to a simple, efficient procedure for recovering durene in substantially pure form from a feed stock containing a low concentration of durene, that is below 15% by volume. Typical feed stocks suitable for the practice of the invention contain from 5 to 15% durene.

Fractions resulting from catalytically cracked naphtha which contain substantial amounts of durene are available to the petroleum industry. Typical fractions of this type which are suitable for use as feed stocks in the practice of the present invention are illustrated by the samples, the characteristics of which are set out hereafter in tabular form in Table I:

Table 1

| Sample number | 1 | 2 | 3 |
|---|---|---|---|
| Analysis: | | | |
| Durene, Wt. Percent | 9.7 | 11.6 | 10.6 |
| Isodurene, Wt. Percent | 12.2 | 13.6 | 12.4 |
| Naphthalene, Wt. Percent | 0.0 | Trace | 2.0 |
| Aromatics, Vol. Percent | 92 | 97 | 95 |
| Paraffins, Vol. Percent | 8 | 3 | 5 |
| ASTM Distillation: | | | |
| I. B. P., ° F | 357 | 366 | 366 |
| F. B. P., ° F | 407 | 415 | 424 |
| Recovery, Percent | 98.8 | 98.8 | 98.0 |
| Residue, Percent | 1.0 | 1.0 | 1.0 |
| Loss, Percent | 0.2 | 0.2 | 1.0 |

The material listed as durene (1,2,4,5-tetramethyl benzene) has a melting point of 174.5° F. and a boiling point of 384.6° F., while isodurene (1,2,3,5-tetramethyl benzene) has a melting point of 11.3° F. and a boiling point of 388.4° F.

The process of the present invention may be described briefly as follows:

A feed stock having a durene content of less than 15% is chilled to a temperature within the range of —75° F. to —110° F. which causes durene crystals to be formed. These durene crystals have poor filtering characteristics. They are poorly defined and pliable; they appear to be suspended in the liquid in a manner similar to small feathers in oil and have the characteristics of fusing under centrifugation pressure to make a relatively non-porous cake. This chilled feed stock is then separated into a liquid fraction and a filter cake fraction in a first separating step to form a filter cake which may contain in the range from 15 to 50% durene. A filter cake having this low concentration of durene may be easily formed in spite of the poor filtering characteristics of the durene crystals. This first filter cake is then melted to form a first melt which in turn is chilled to 0° F. to form a second slurry. The durene crystals in this second slurry are well defined and firm although they do not have as good filtering properties as do the durene crystals formed from more concentrated stocks. The second slurry is separated in a second separating step into a second filtrate and a second filter cake fraction containing more than 60% and less than 90% durene. The second filter cake fraction is then melted to form a third melt which is cooled to about 100° F. to form a third slurry which is separated in a third separating step into a third filtrate and third filter cake fraction. The third filter cake fraction consists of large firm crystals having excellent filtration characteristics and as a result this fraction may be recovered as a high purity durene fraction.

In carrying out the procedure described in the preceding paragraph it is preferred that the filtrate from the first separating zone be discarded from the system, that from the second separating zone be added to fresh charge stock and that from the third separating zone be added to the first melt for recycling to the second separating step. In this manner the only durene discarded is that in the filtrate removed from the first separating step. Thus, the durene yield is determined by the amount discarded from the first stage. By the employment of three chilling and separating stages in series, the first two separating steps may be conducted rapidly with a poor separation, while in the third stage the durene crystals have good filtering characteristics so that a high purity durene may be recovered rapidly from this stage. Thus, in each of the three separating stages there is a rapid separation of a filter cake fraction from a filtrate fraction.

The invention will be further described by reference to the drawing in which

Figure 2:
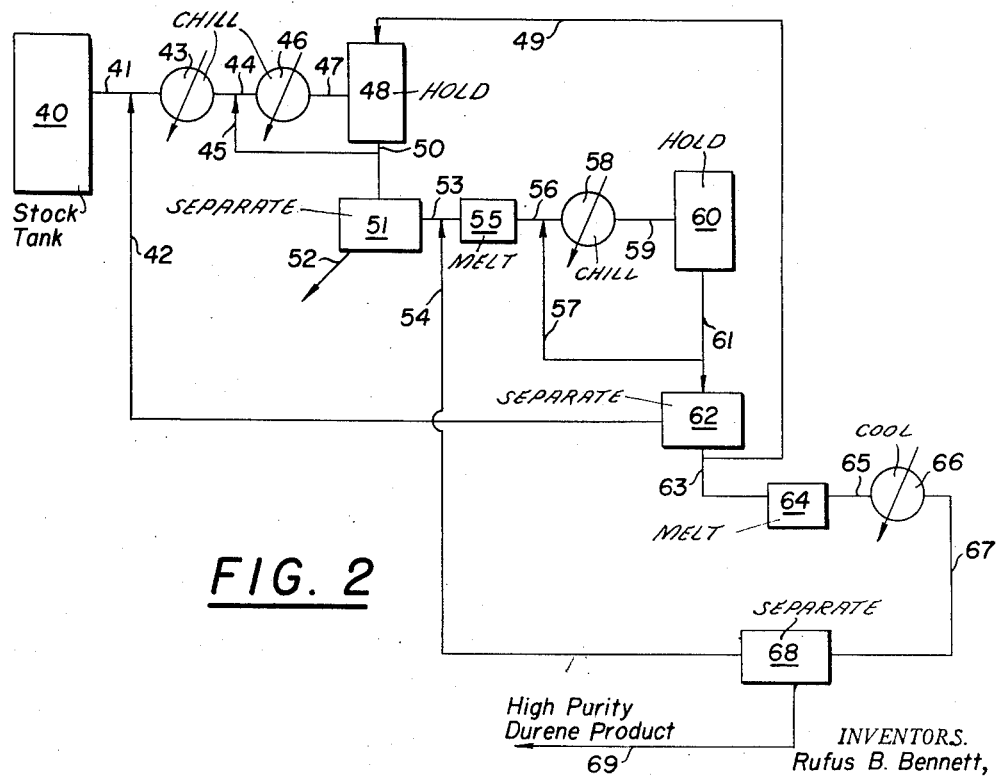

Fig. 1 is in the form of a flow sheet illustrating one procedure of carrying out the present invention; and, Fig. 2 is in the form of a flow sheet illustrating a similar procedure but with additional seeding and crystallizing steps.

Turning now specifically to the drawing and first to Fig. 1, 11 designates a charge tank containing liquid mixture of hydrocarbons. The feed stock from tank 11 is withdrawn through line 12 where it is combined with recycle from line 13. The mixture passes to a chilling step 14 where it is chilled to a temperature within the range of —75° F. to —110° F. and then passes by line 15 into holding tank 16. It is preferred to hold the chilled mixture in holding tank 16 for a time sufficient to promote the growth of crystals in the mixture, since that durene which does not separate out as crystals in the first separating step is discarded from the system. As a further advantage, holding tank 16 acts as a surge tank which is necessary to smooth out the operation if the following separating step is conducted as a batch operation. From holding tank 16 the chilled slurry passes by way of line 17 into the first separating zone 18 which is of such a character as to separate the slurry into a filtrate and a filter cake. The separation step in zone 18 may be carried out in a conventional type of separating means, such as a basket type centrifuge or a rotary filter. From separating zone 18 a filtrate fraction is removed through line 19. The filter cake fraction is withdrawn from separating zone 18 through line 20 and passes to melting tank 21 where it is heated to a temperature of approximately 100° F. to form a first melt. This first melt is withdrawn from vessel 21 through line 22 where it is mixed with recycle from line 23 and the mixture passed to a chiller 24 where it is chilled to a temperature of about —0°. The chilled mixture passes from chiller 24 by line 25 to a second holding tank 26. From holding tank 26 the slurry passes by line 27 to a second separating zone 28. Separating zone 28 separates the slurry into a filter cake fraction and a filtrate fraction and may be carried out in a conventional type of separating means, such as a basket type centrifuge or rotary filter. From separating zone 28 the filtrate is withdrawn through line 13 and added to fresh feed stock in line 12 as previously described. The filter cake first is withdrawn from separating zone 28 through line 29 and sent to the second melting zone 30 where it is heated to a temperature of about 150° F. The melt from melting zone 30 is passed through line 31 to a cooling zone 32 where it is cooled to a temperature of about 100° F. to form a third crystal containing slurry and then passed through line 33 to a third separating zone 34. The third separating zone 34 separates the slurry into a filter cake fraction and a filtrate fraction and may be carried out in a conventional type of separating means, such as a basket type centrifuge or rotary filter. The filtrate is withdrawn through line 23 and is the recycle which is added to the melt in line 22, as previously described, and the filter cake fraction is withdrawn through line 35 as a high purity durene product.

By way of an example in order to illustrate further the present invention 100 parts of $C_{10}$ aromatic hydrocarbon mixture containing 5.9 parts by weight of durene were admixed with 25.6 parts of a recycle fraction containing 1.8 parts of durene from the second stage of the present invention. The resultant mixture would be obtained upon mixing feed stock from tank 11 with recycle from zone 28 prior to the chilling step 14 in Fig. 1. This mixture was chilled to −100° F. and separated by the use of a basket type centrifuge into a filtrate fraction consisting of 94.5 parts filtrate containing .7 parts durene and a filter cake fraction consisting of 31.1 parts of hydrocarbon containing 7.1 parts of durene. The filter cake fraction was melted and had added thereto 5.4 parts of a fraction containing 2.4 parts of durene of a recycle stream from the third stage of this invention. Thus, the mixture corresponds to the melted filter cake from zone 21 admixed with a recycle stream from line 23 prior to the second chilling step 24 as shown in Fig. 1. This latter admixture was cooled in a cooling zone to 0° F. and separated by the use of a basket type centrifuge into a second filtrate and a second filter cake. The second filter cake consisted of 10.9 parts containing 7.6 parts of durene; the second filtrate corresponding to 25.6 parts was recycled and admixed with the 100 parts of feed. Said second filter cake corresponded to the filter cake removed from separating zone 28. This cake was melted at about 150° F., then cooled to a temperature of about 100° F. to crystallize the durene therein and subsequently centrifuged in a basket centrifuge to obtain 5.5 parts of filter cake containing 5.2 parts of durene.

In the description of Fig. 1 heretofore given, the cooling zones were shown in the drawing by way of rectangles designated 14, 24, and 32. Actually, it will be understood that each cooling zone may be carried out by the use of several refrigeration units.

As an alternative procedure for carrying out the present invention additional steps for encouraging the growth of crystals including seeding techniques and crystal growing holding tanks may be employed. Such an alternative procedure is illustrated in Fig. 2.

Turning now specifically to Fig. 2, a durene containing feed stock from tank 40 is withdrawn through line 41 and mixed with recycle filtrate through line 42, the admixture being passed to a preliminary cooling zone 43 where it is chilled to a temperature within the range of about 0 to −40° F. but above the crystallization point of the mixture. The chilled mixture is removed from chiller 43 by line 44 and is seeded with seed crystals introduced through line 45. The seeded mixture then passes through chiller 46 which may, for example, be a scraped surface type chiller and there chilled to the final chilling temperature within the range of −75° F. to −100° F. to form a slurry. The slurry is withdrawn from chiller 46 through line 47 and discharged into holding tank 48 where it is maintained in a quiescent condition for an interval of time within the range of 30 minutes to three hours to encourage the growth of crystals. Large crystals from a subsequent chilling and separating stage are introduced into a holding tank 48 through line 49 in order to assist in the growth of crystals within the holding tank. From holding tank 48 slurry is removed through line 50 and a portion withdrawn through branch line 45 for seeding the chilled feed stock as previously described while the remainder is passed into a first separating zone 51. Separating zone 51 is of such character as to form a filter cake and a filtrate and may be a conventional means such as a basket type centrifuge or rotary filter. In separating zone 51 a filtrate is removed through line 52 and discarded and a filter cake fraction is removed through outlet line 53 and has admixed therewith recycle by means of line 54. The resultant mixture is passed to a melting tank 55 where it is heated to a temperature of about 100° F. to form a first melt. The first melt is withdrawn from tank 55 by line 56 and has seed crystals added thereto through line 57, the seeded mixture then passing to chilling zone 58 where it is chilled to a temperature of about 0° F. to form a second slurry. The second slurry is withdrawn from chilling zone 58 through line 59 and discharged into second holding tank 60 where it is held for an average residence time within the range of 30 minutes to three hours to encourage crystal growth. From holding tank 60 slurry is withdrawn through line 61 with a part being recycled through line 57 to seed the first melt as previously described and the remainder passed to a second separating zone 62 where it is separated into a second filtrate which is recycled through line 42, previously mentioned, for admixture with fresh feed stock and a second filter cake which is withdrawn through outlet 63. A part of the filter cake fraction withdrawn through outlet line 63 is passed through line 49 to holding tank 48 to serve as seed crystals therein. In the drawing the means for transporting the crystals is shown as a line 49, although it is to be understood that the drawing is merely schematic and that in actual practice any suitable means for conveying a part of the filter cake from separating means 62 to holding tank 48 may be used. The remainder of the filter cake fraction passes from line 63 to melt tank 64 where it is heated to a temperature of approximately 150° F. to form a second melt. The second melt is withdrawn from melting tank 64 through line 65 and passed to a cooling zone 66 where it is cooled to a temperature of approximately 100° F. to cause durene crystals to form therein. The cooled mixture is then passed through line 67 to third separating zone 68. The third separating zone 68 is like the separating zones 51 and 62 previously described in that it separates the feed into a filtrate fraction and a filter cake fraction. The filtrate fraction is withdrawn through branch line 54 and introduced to the first filter cake fraction in line 53 as previously described and the filter cake fraction is withdrawn through outlet 69 as a high purity durene product.

Having fully described and illustrated the method of the present invention, what we desire to claim is:

1. A method for recovering a high purity durene fraction from a feed stock containing durene in an amount not greater than 15% including the steps of chilling said feed stock to a temperature in the range of −75° F. to −110° F. to form a first slurry containing durene crystals, separating from said first slurry a first liquid fraction and a first filter cake fraction including said durene crystals and containing within the range of 15% to 50% durene, melting said first filter cake fraction, using it to form a second feed stock, chilling said second feed stock to a temperature of approximately 0° F. to form a second slurry containing durene crystals, separating from said second slurry a second filter cake fraction containing durene crystals in an amount within the range of 60% to 90% durene and a second liquid fraction, melting said second filter cake and using it to form a third feed stock containing durene within the range of 60% to 90%, cooling said third feed stock to a temperature of approximately 100° F. to form a third slurry containing durene crystals and separating from said feed stock a third filter cake as high purity durene product and a third liquid fraction, admixing the second liquid fraction with the feed stock, and adding the third liquid fraction to the first filter cake fraction for admixture with the melted first filter cake fraction.

2. A method for recovering durene from a charge stock containing less than 15% durene including the steps of preliminarily cooling said feed stock to a temperature in the range of about 0 to —40° F. and above the crystallization temperature of durene, adding to the chilled feed stock seed crystals of durene from a first holding zone, chilling the seeded mixture to a temperature within the range of —75° F. to —110° F. and maintaining it at said temperature range under quiescent conditions in said first holding zone to assist the growth of crystals therein, removing slurry from said first holding zone and separating it in a first separating step into a first liquid phase and a first filter cake component containing within the range of 15% to 50% of durene, using said first filter cake component to form a first melt, chilling said first melt to a temperature of approximately 0° F. and holding it in a second holding zone under quiescent conditions for at least 30 minutes to aid in the growth of crystals, removing slurry from said second holding zone and separating it in a second separating step into a second liquid phase and a second filter cake phase, using at least a portion of said second filter cake phase to form a second melt containing durene within the range of 60% to 90%, cooling said second melt to a temperature of approximately 100° F. to form a third slurry of durene crystals, and separating the third slurry in a third separating step into a third liquid phase and a third filter cake as a high purity durene product, admixing the second liquid phase with the feed stock, and adding the third liquid phase to the first filter cake component for admixture with said melted first filter cake component to form an additional amount of first melt.

3. A method in accordance with claim 2 in which a portion of the second filter cake from the second separating step is added to the first holding zone in crystalline form to serve as seed crystals therein.

4. A method for recovering a high purity durene fraction from a feed stock containing no more than 15% durene including the steps of preliminarily cooling said feed stock in a first chilling zone to a temperature of about 0° to —40° F. and above the crystallization temperature thereof, adding to the chilled feed stock seed crystals of durene from a first holding zone, chilling the seeded mixture to a temperature in the range of —75° F. to —110° F. and maintaining it in said temperature range under quiescent conditions in said first holding zone for at least 30 minutes to assist crystal growth therein, removing slurry from said first holding zone and adding it to chilled feed stock as seeding material, removing an additional portion of slurry from the first holding zone and passing it to a first separating zone where it is separated into a liquid fraction and a first filter cake fraction, forming from said first filter cake fraction a first melt containing within the range of 15% to 50% durene, chilling said first melt to a temperature of about 0° F. to form a second slurry and holding said second slurry in a second holding zone under quiescent conditions for at least 30 minutes to aid in the growth of crystals, removing a portion of the slurry from the second holding zone and adding it to said first melt as seed crystals, removing another portion of slurry from said second holding zone and separating it in a second separating zone into a second liquid fraction and a second filter cake fraction, admixing the second liquid fraction with fresh feed stock to form the feed stock sent to the first cooling zone, removing a portion of the second filter cake fraction in crystal form and adding it to the first holding zone as seeding material, forming from the remainder of said second filter cake fraction a second melt containing within the range of 60% to 90% durene, cooling the second melt to a temperature of approximately 100° F. to form a third slurry of durene crystals, separating said third slurry in a third separating zone into a third liquid fraction and a third filter cake fraction, adding the third liquid fraction to the first filter cake to form an additional amount of first melt and recovering at least a portion of said third filter cake fraction as a high purity durene product.

References Cited in the file of this patent

UNITED STATES PATENTS

| | | |
|---|---|---|
| 2,511,711 | Hetzner et al. | June 13, 1950 |
| 2,517,601 | Shafor et al. | Aug. 8, 1950 |
| 2,530,978 | Mason | Nov. 21, 1950 |
| 2,533,232 | Dressler | Dec. 12, 1950 |
| 2,540,977 | Arnold | Feb. 6, 1951 |
| 2,560,373 | Shmidl | July 10, 1951 |
| 2,665,316 | Bennett | Jan. 5, 1954 |
| 2,688,045 | Powers et al. | Aug. 31, 1954 |

FOREIGN PATENTS

| | | |
|---|---|---|
| 670,474 | Germany | Jan. 19, 1939 |

OTHER REFERENCES

Birch et al.: Jour. Am. Chem. Soc., vol. 71, page 1364 (1949).